(12) United States Patent
Sensui (10) Patent No.: US 6,246,529 B1
(45) Date of Patent: Jun. 12, 2001

(54) WIDE-ANGLE ZOOM LENS SYSTEM

(75) Inventor: Takayuki Sensui, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/427,190

(22) Filed: Oct. 26, 1999

(30) Foreign Application Priority Data

Oct. 26, 1998 (JP) ................................. 10-304424

(51) Int. Cl.$^7$ ....................................... G02B 15/14
(52) U.S. Cl. ..................... 359/680; 359/681; 359/685; 359/689
(58) Field of Search ................... 359/680, 681, 359/682, 685, 689, 708, 739, 740

(56) References Cited

U.S. PATENT DOCUMENTS

| | | | |
|---|---|---|---|
| 4,735,493 | 4/1988 | Tachihara | 359/692 |
| 5,164,859 | 11/1992 | Ito | 359/692 |
| 5,325,236 | * 6/1994 | Tanaka | 359/689 |
| 5,329,401 | * 7/1994 | Sato | 359/686 |
| 5,434,710 | * 7/1995 | Zozawa | 359/689 |
| 5,748,384 | 5/1998 | Sensui | 359/686 |
| 5,786,942 | * 7/1998 | Komori et al. | 359/686 |
| 5,808,808 | * 9/1998 | Yamanashi | 359/682 |
| 5,877,901 | 3/1999 | Enomoto et al. | 359/691 |
| 5,910,860 | 6/1999 | Ozaki et al. | 359/691 |

\* cited by examiner

Primary Examiner—Georgia Epps
Assistant Examiner—David N. Spector
(74) Attorney, Agent, or Firm—Greenblum & Bernstein, P.L.C.

(57) ABSTRACT

A wide-angle zoom lens system including a negative first lens group, a positive second lens group, a diaphragm, and a positive third lens group, in this order from the object; whereby upon zooming from the short focal length extremity towards the long focal length extremity, each lens group is arranged to move so that the space between the first and second lens groups and the space between the second and third lens groups are narrowed; and the wide-angle zoom lens system preferably satisfies the following condition:

$$0.36 < (D2S - D2L)/(fL - fS) < 0.7 \qquad (1)$$

wherein:
D2S designates the distance between the second lens group and the third lens group at the short focal length extremity;
D2L designates the distance between the second lens group and the third lens group at the long focal length extremity;
fL designates the focal length of the entire lens system at the long focal length extremity; and
fS designates the focal length of the entire lens system at the short focal length extremity.

3 Claims, 14 Drawing Sheets

Fig. 1

Fig. 2A
Fno=4

-0.5   0.5
SPHERICAL
ABERRATION
CHROMATIC
ABERRATION

Fig. 2B
W=47.8°

-0.05   0.05
LATERAL
CHROMATIC
ABERRATION

Fig. 2C
W=47.8°

-0.5   0.5
ASTIGMATISM

Fig. 2D
W=47.8°

-4  %  4
DISTORTION

Fig. 3

Fig. 4A
Fno=4

—— d line
······ g line
---- C line

−0.5   0.5
SPHERICAL
ABERRATION

CHROMATIC
ABERRATION

Fig. 4B
W=32.6°

−0.05   0.05
LATERAL
CHROMATIC
ABERRATION

−0.5   0.5
ASTIGMATISM

Fig. 4D
W=32.6°

−4  %  4
DISTORTION

Fig. 5

Fig. 6A
Fno=4

—— d line
------ g line
— — C line

—— S
-- M

-0.5    0.5
SPHERICAL
ABERRATION
CHROMATIC
ABERRATION

-0.05    0.05
LATERAL
CHROMATIC
ABERRATION

-0.5    0.5
ASTIGMATISM

-4  %  4
DISTORTION

Fig. 7

Fig. 8A
Fno=4

—0.5  0.5
SPHERICAL
ABERRATION

CHROMATIC
ABERRATION

— d line
······ g line
---- C line

Fig. 8B
W=32.8°

—0.05  0.05
LATERAL
CHROMATIC
ABERRATION

Fig. 8C
W=32.8°

—0.5  0.5
ASTIGMATISM

—4  %  4
DISTORTION

Fig. 14A 
Fno=4
−0.5   0.5
SPHERICAL
ABERRATION

CHROMATIC
ABERRATION

—— d line
------ g line
- - - C line

Fig. 14B 
W=47.8°
−0.05   0.05
LATERAL
CHROMATIC
ABERRATION

Fig. 14C 
W=47.8°
−0.5   0.5
ASTIGMATISM

—— S
- - M

Fig. 14D 
W=47.8°
−4  %  4
DISTORTION

Fig. 18A 
Fno=4
-0.5  0.5
SPHERICAL
ABERRATION

CHROMATIC
ABERRATION

——— d line
------ g line
----- C line

Fig. 18B 
W=47.8°
-0.05  0.05
LATERAL
CHROMATIC
ABERRATION

Fig. 18C 
W=47.8°
-0.5  0.5
ASTIGMATISM

— S
-- M

Fig. 18D 
W=47.8°
-4 %  4
DISTORTION

Fig. 19

Fig. 20A  Fig. 20B  Fig. 20C  Fig. 20D
Fno=4    W=32.6°   W=32.6°   W=32.6°

— d line
--- g line
---- C line

— S
-- M

-0.5   0.5       -0.05   0.05       -0.5   0.5       -4 %   4
SPHERICAL         LATERAL            ASTIGMATISM      DISTORTION
ABERRATION        CHROMATIC
                  ABERRATION
CHROMATIC
ABERRATION

WIDE-ANGLE ZOOM LENS SYSTEM

BACKGROUND OF THE INVENTION

1. Field of the Invention

The present invention relates to a wide-angle zoom lens system, for single lens reflex cameras, which has an angle-of-view (=2ω) of more than 90° at the short focal length extremity.

2. Description of the Related Art

In a single lens reflex camera, it is necessary to maintain a long back focal distance because a quick-return mirror is positioned behind the photographing lens system. For this reason, a retrofocus lens system having a negative lens element and a positive lens element, in this order from the object, is generally employed for a wide-angle lens system. However, in a retrofocus lens system, it is extremely difficult to correct field curvature in the vicinity of the short focal length extremity. Generally, in a zoom lens system where a negative lens group precedes a positive lens group, each lens group has to be provided with stronger power in order to make an overall length of the lens system shorter while securing a long back focal distance and maintaining the diameter of lens elements smaller.

However, if the power of each lens group is increased, optical deterioration on the wide-angle side occurs at the periphery of the image forming area. In other words, the occurrence of field curvature, astigmatic difference and distortion becomes noticeable. More concretely, in order to prevent field curvature on the wide-angle side which tends to become larger, at a periphery of an image, in the positive direction, field curvature at a lower image height has to be largely bent in the negative direction. Field curvature at a periphery of an image on the telephoto side corresponds to the tendency of field curvature at the lower image height on the wide-angle side, that is, the field curvature at a periphery of a image on the telephoto side is largely bent in the negative direction. As a result, in such a zoom lens system, field curvature extremely changes from the wide-angle towards the telephoto-angle.

Due to the above-mentioned problems, in a zoom lens system, particularly, in a wide-angle zoom lens system in which the angle-of-view at the short focal length extremity is more than 90°, for the purpose of miniaturization and in order to correct aberrations other than field curvature, field curvature has to be allowed to remain to some extent.

SUMMARY OF THE INVENTION

It is an object of the present invention to provide a zoom lens system, for single lens reflex cameras, which has a superwide angle-of-view of more than 90° at the short focal length extremity, and which is compact, and can suitably correct filed curvature over the entire focal length range including the vicinity of the short focal length extremity.

In order to achieve the above mentioned object, there is provided a wide-angle zoom lens system including a negative first lens group, a positive second lens group, a diaphragm, and a positive third lens group, in this order from the object; whereby upon zooming from the short focal length extremity towards the long focal length extremity, each lens group is arranged to move so that the space between the first and second lens groups and the space between the second and third lens groups are narrowed; and the wide-angle zoom lens system preferably satisfies the following condition:

$$0.36 < (D2S - D2L)/(fL - fS) < 0.7 \tag{1}$$

wherein:

D2S designates the distance between the second lens group and the third lens group at the short focal length extremity;

D2L designates the distance between the second lens group and the third lens group at the long focal length extremity;

fL designates the focal length of the entire lens system at the long focal length extremity; and fS designates the focal length of the entire lens system at the short focal length extremity.

The wide-angle zoom lens system preferably satisfies the following condition:

$$0.25 < f23S/f2 < 0.5 \tag{2}$$

wherein:

f23S designates the combined focal length of the second lens group and the third lens group at the short focal length extremity; and f2 designates the focal length of the second lens group.

The present disclosure relates to subject matter contained in Japanese Patent Application No. Hei-10-304424 (filed on Oct. 26, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 25:
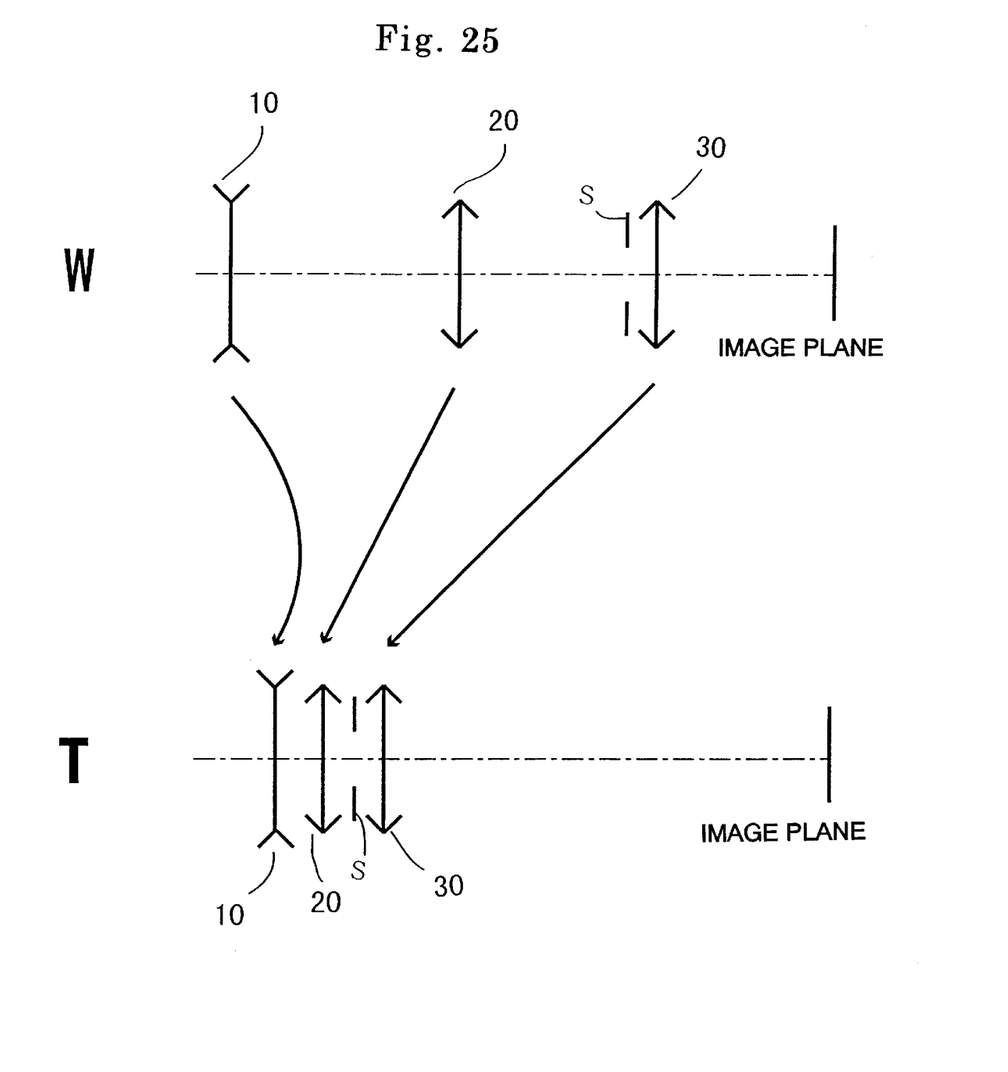
FIG. 25 is a diagram showing lens-group moving paths of a zoom lens system.

A wide-angle zoom lens system constituted by three lens groups, as shown in the lens-group moving paths in FIG. 25, includes a negative first lens group 10, a positive second lens group 20, and a positive third lens group 30, in this order from the object. Upon zooming from the short focal length extremity towards the long focal length extremity, the first lens group 10 moves towards the image and changes the moving direction towards the object in the vicinity of the long focal length extremity, and the second lens group 20 and the third lens group 30 move towards the object, while the space between the first lens group 10 and the second lens group 20 and the space between the second lens group 20 and the third lens group 30 are narrowed. A diaphragm S is positioned between the second lens group 20 and the third lens group 30, and moves integrally with the third lens group 30.

In the above described wide-angle zoom lens system, through the varying of the distance between the second lens group 20 and the third lens group 30 according to the focal length, field curvature can be corrected over the entire focal length including the short focal length extremity. Condition (1) specifies the distance between the second lens group 20 and the third lens group 30. By satisfying this condition, the correcting of field curvature can be performed in a highly effective manner, and other aberrations can be kept in a well balanced manner while the length of the entire lens system can effectively be made much more shorter.

If (D2S–D2L)/(fL–fS) exceeds the upper limit of condition (1), i.e., if the second lens group 20 and the third lens group 30 are too far apart at the short focal length extremity and are too close together at the long focal length extremity, the entire length of the lens system increases, and thereby it becomes difficult to maintain a long back focal distance at the short focal length extremity. On the other hand, if (D2S–D2L)/(fL–fS) exceeds the lower limit of condition (1), i.e., if the second lens group 20 and the third lens group 30 are too close together at the short focal length extremity and are too far apart at the long focal length extremity, field curvature occurs in the negative direction at a focal length range in the vicinity of the short focal length extremity; on the other hand, field curvature occurs in the positive direction at a focal length range in the vicinity of the long focal length extremity, so that field curvature changes upon zooming.

Condition (2) specifies power of the second lens group 20. If the positive second lens group 20 and the positive third lens group 30 are supposed to be the rear lens group of a retrofocus lens system, condition (2), in particular, specifies the power of the second lens group 20 with respect to the combined power of the second and third lens groups.

If f23S/f2 exceeds the upper limit of condition (2), it becomes difficult to maintain a long back focal distance at the short focal length extremity, and the correcting of aberrations at the long focal length extremity becomes insufficient. On the other hand, if f23S/f2 exceeds the lower limit of condition (2), the change in field curvature upon zooming cannot be maintained within an allowable limit.

Specific numerical data of the embodiments will be described hereinafter. In the diagrams of chromatic aberration represented by spherical aberration (axial chromatic aberration), the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables of the following embodiments, $F_{NO}$ designates the F-number, f designates the focal length of the entire lens system, W designates the half angle-of-view, fB designates the back focal distance, R designates the radius of curvature of each lens surface, D designates the lens thickness or the distance between the lens elements, $N_d$ designates the refractive index at the d-line, and v designates the Abbe number. A value of 'D' at the position of the diaphragm designates the distance from the diaphragm S to the most-object side surface of the third lens group.

In addition to the above, an a spherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}\ldots;$$

wherein:

x designates a distance from a tangent plane of an a spherical vertex;

C designates a curvature of the a spherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

[Embodiment 1]

Figure 1:
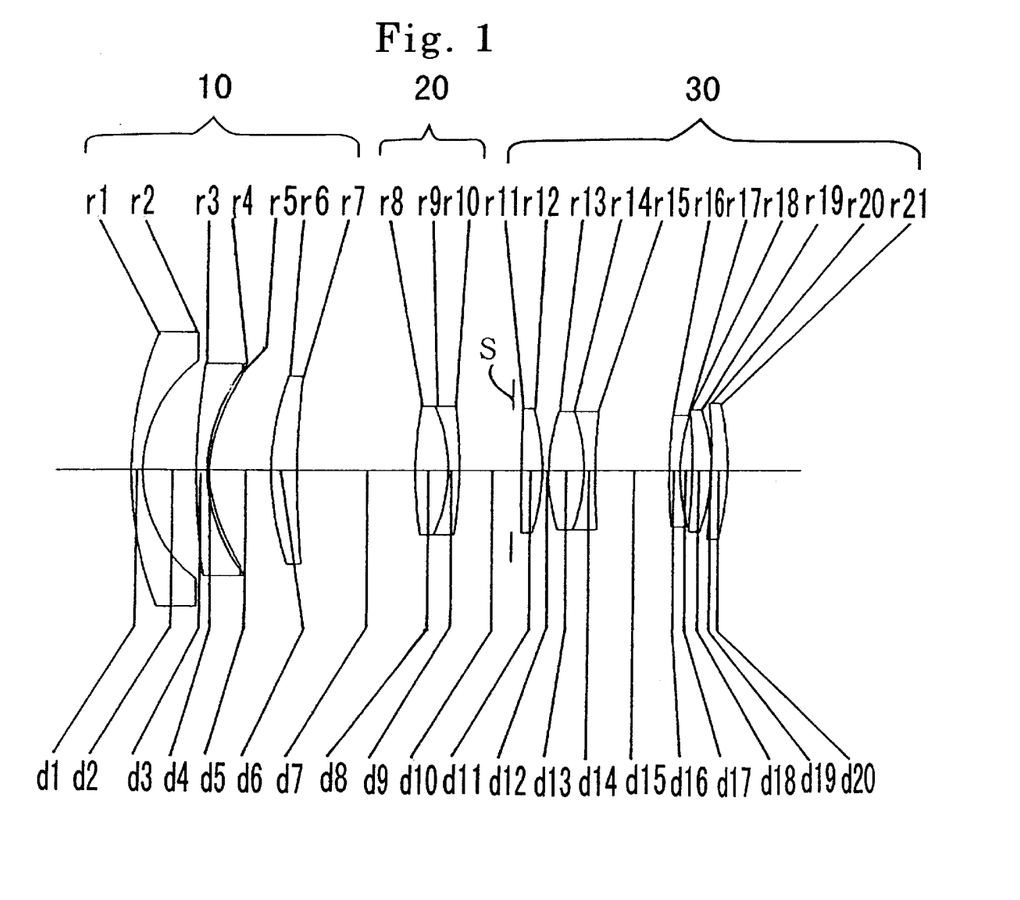
FIG. 1 is a lens arrangement of a first embodiment of a zoom lens system at the short focal length extremity.
Figures 2A, 2B:
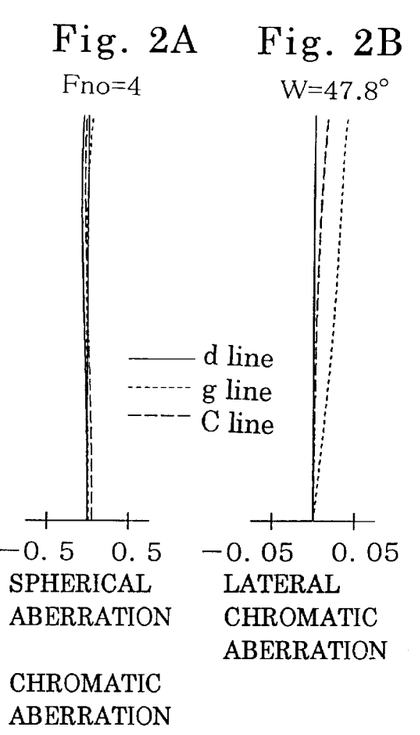
FIGS. 2A, 2B, 2C and 2D are aberration diagrams of the lens arrangement shown in FIG. 1.
Figure 2C:
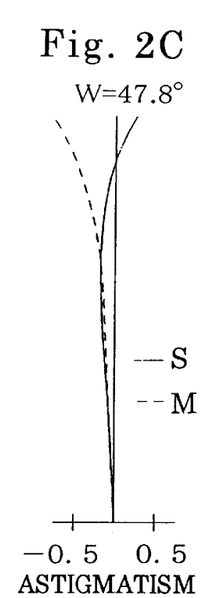
Figure 2D:
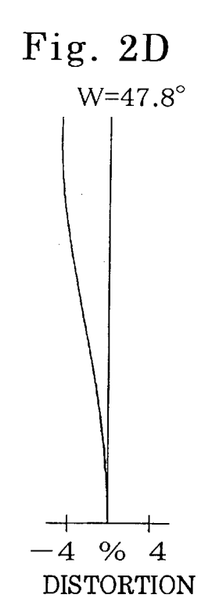
Figure 3:
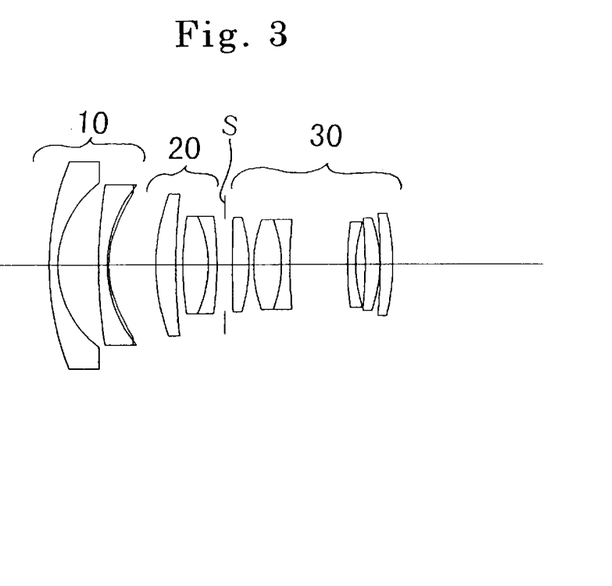
FIG. 3 is the lens arrangement of the first embodiment of the zoom lens system at the long focal length extremity.
Figures 4A, 4B:
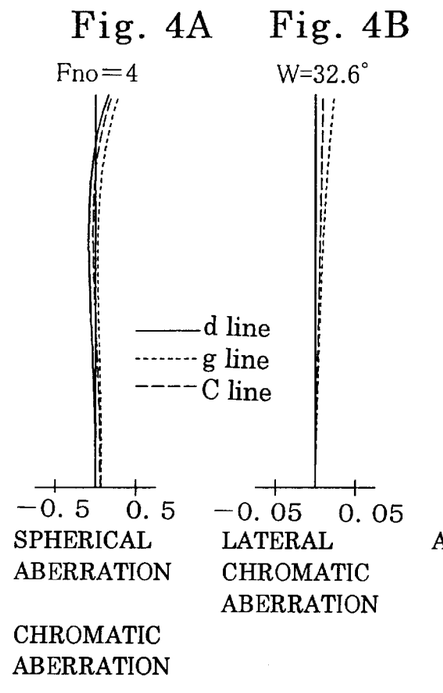
FIGS. 4A, 4B, 4C and 4D are aberration diagrams of the lens arrangement shown in FIG. 3.
Figure 4C:
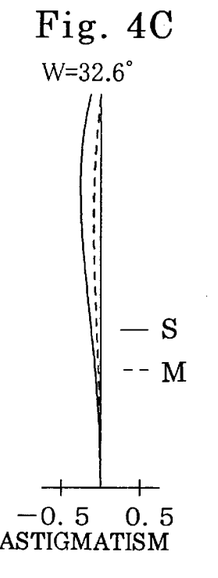
Figure 4D:
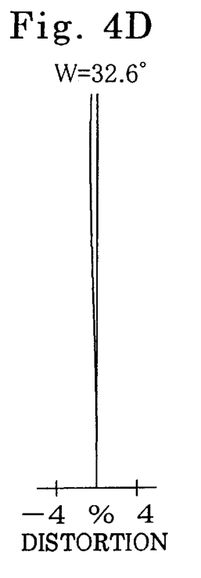

FIGS. 1 and 3 respectively show the lens arrangements of a first embodiment of a zoom lens system at the short focal length extremity and the long focal length extremity. FIGS. 2A, 2B, 2C, 2D, and 4A, 4B, 4C, 4D are aberration diagrams of the lens arrangements shown in FIGS. 1 and 3. Table 1 shows the numerical data thereof. Surface Nos. 1 through 7 are the negative first lens group 10, surface Nos. 8 through 10 are the positive second lens group 20, and surface Nos. 11 through 21 are the positive third lens group 30. The first lens group 10 includes a negative lens element, a hybrid lens element whose image side surface is formed as an aspherical surface, and a positive lens element, in this order from the object. The second lens group 20 includes a cemented sub-lens group having a positive lens element and a negative lens element. The third lens group 30 includes a positive lens element, a cemented sub-lens group having a positive lens element and a negative lens element, a negative lens element, a positive lens element and a positive lens element, in this order from the object.

TABLE 1

$F_{NO} = 1:4-4$
f = 20.60–34.00 (Zoom Ratio: 1.65)
W = 47.8–32.6
$f_B$ = 36.90–53.66

| Surface No. | R | D | Nd | ν |
|---|---|---|---|---|
| 1 | 50.915 | 1.500 | 1.78590 | 44.2 |
| 2 | 18.677 | 7.201 | — | — |
| 3 | 95.348 | 1.500 | 1.80400 | 46.6 |
| 4 | 22.551 | 0.280 | 1.53256 | 45.9 |
| 5* | 18.000 | 8.314 | — | — |
| 6 | 37.544 | 3.520 | 1.84666 | 23.8 |
| 7 | 127.898 | 16.008–1.200 | — | — |
| 8 | 53.582 | 4.468 | 1.51742 | 52.4 |
| 9 | −21.269 | 1.500 | 1.80400 | 46.6 |
| 10 | −63.353 | 7.196–1.400 | — | — |
| Diaphragm | ∞ | 1.288 | — | — |
| 11 | 321.162 | 2.877 | 1.60285 | 43.5 |
| 12 | −29.502 | 0.861 | — | — |
| 13 | 24.960 | 4.828 | 1.48749 | 70.2 |
| 14 | −23.877 | 1.500 | 1.83400 | 37.2 |
| 15 | 90.211 | 10.070 | — | — |
| 16 | 63.256 | 1.500 | 1.84666 | 23.8 |
| 17 | 25.491 | 1.671 | — | — |
| 18 | −81.972 | 2.558 | 1.58913 | 61.2 |
| 19 | −25.305 | 0.100 | — | — |
| 20 | −94.077 | 2.187 | 1.58913 | 61.2 |
| 21 | −39.658 | — | — | — |

*designates the aspherical surface which is rotationally symmetrical with respect to the optical axis.

| Surface No. | K | A4 | A6 | A8 |
|---|---|---|---|---|
| 5 | −1.00 | −0.9829 × 10$^{-5}$ | −0.2078 × 10$^{-7}$ | −0.4786 × 10$^{-10}$ |

[Embodiment 2]

Figure 5:
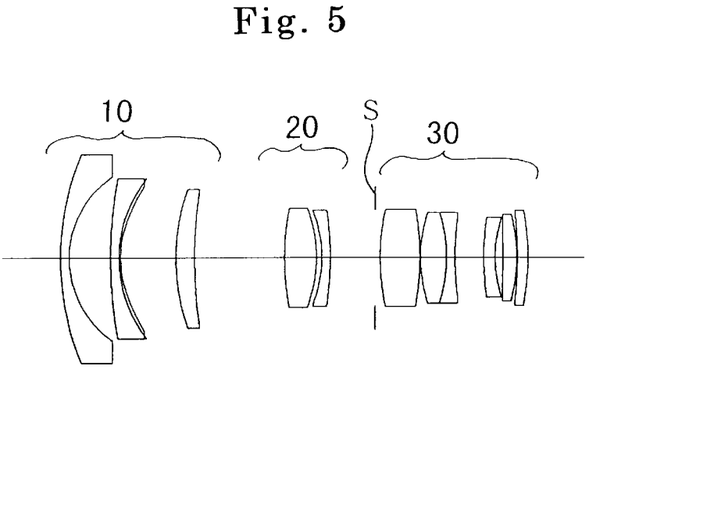
FIG. 5 is a lens arrangement of a second embodiment of a zoom lens system at the short focal length extremity.
Figures 6A, 6B:
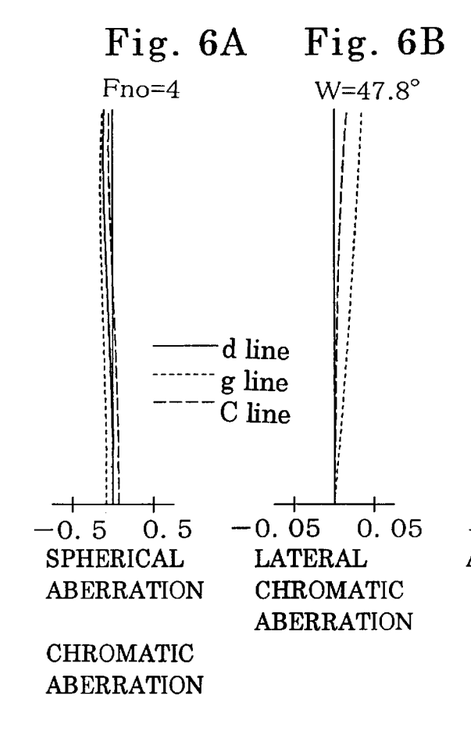
FIGS. 6A, 6B, 6C and 6D are aberration diagrams of the lens arrangement shown in FIG. 5.
Figure 6C:
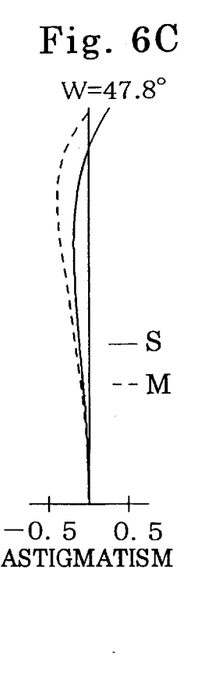
Figure 6D:
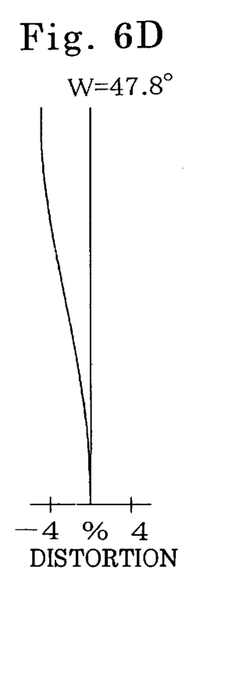
Figure 7:
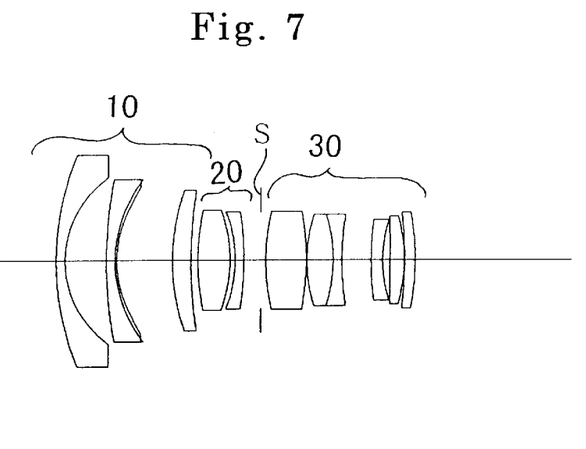
FIG. 7 is the lens arrangement of the second embodiment of the zoom lens system at the long focal length extremity.
Figure 8A:
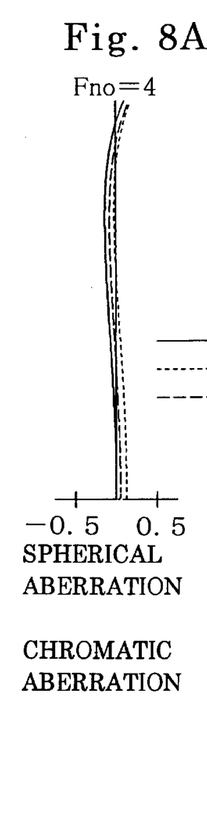
FIGS. 8A, 8B, 8C and 8D are aberration diagrams of the lens arrangement shown in FIG. 7.
Figure 8B:
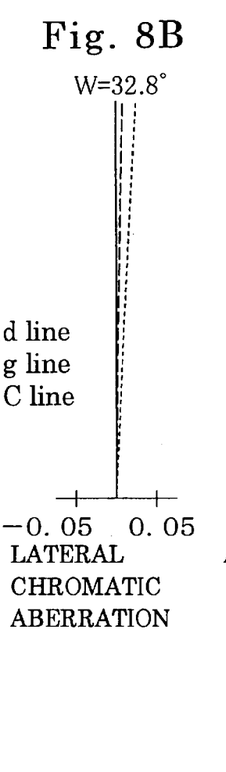
Figure 8C:
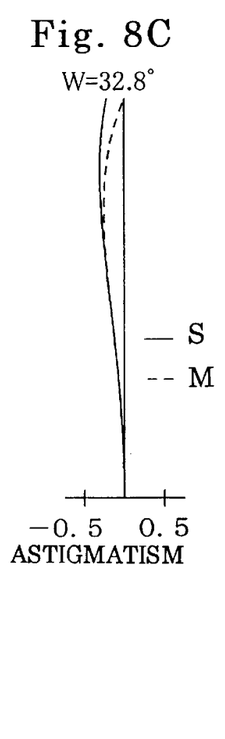
Figure 8D:
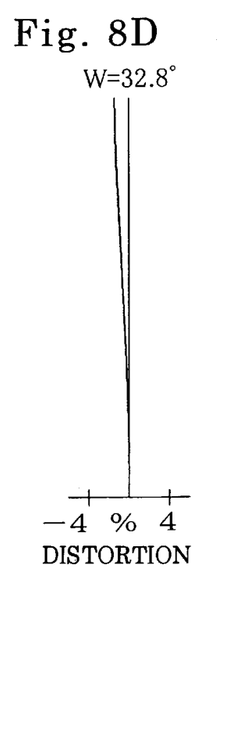

FIGS. 5 and 7 respectively show the lens arrangements of a second embodiment of a zoom lens system at the short focal length extremity and the long focal length extremity. FIGS. 6A, 6B, 6C, 6D, and 8A, 8B, 8C, 8D are aberration diagrams of the lens arrangements shown in FIGS. 5 and 7. Table 2 shows the numerical data thereof. Surface Nos. 1 through 7 are the negative first lens group 10, surface Nos. 8 through 11 are the positive second lens group 20, and surface Nos. 12 through 22 are the positive third lens group 30. The first lens group 10 includes a negative lens element, a hybrid lens element whose image-side surface is formed as an aspherical surface, and a positive lens element, in this order from the object. The second lens group 20 includes a positive lens element and a negative lens element, in this order from the object. The third lens group 30 includes a positive lens element, a cemented sub-lens group having a positive lens element and a negative lens element, a negative lens element, a positive lens element and a positive lens element, in this order from the object.

TABLE 2

$F_{NO} = 1:4-4$
f = 20.60–34.00 (Zoom Ratio: 1.65)
W = 47.8–32.8
$f_B$ = 36.90–54.06

| Surface No. | R | D | Nd | ν |
|---|---|---|---|---|
| 1 | 49.958 | 1.500 | 1.77250 | 49.6 |
| 2 | 18.055 | 7.133 | — | — |

TABLE 2-continued $F_{NO} = 1:4-4$
f = 20.60–34.00 (Zoom Ratio: 1.65)
W = 47.8–32.8
$f_B$ = 36.90–54.06

| Surface No. | R | D | Nd | ν |
|---|---|---|---|---|
| 3 | 77.021 | 1.500 | 1.80400 | 46.6 |
| 4 | 23.434 | 0.280 | 1.53256 | 45.9 |
| 5* | 18.523 | 9.645 | — | — |
| 6 | 37.751 | 3.237 | 1.84666 | 23.8 |
| 7 | 85.635 | 15.704–1.200 | — | — |
| 8 | 44.844 | 5.556 | 1.51742 | 52.4 |
| 9 | −24.795 | 0.912 | — | — |
| 10 | −23.374 | 1.500 | 1.80610 | 40.9 |
| 11 | −57.231 | 7.823–2.892 | — | — |
| Diaphragm | ∞ | 0.900 | — | — |
| 12 | 40.468 | 7.000 | 1.57099 | 50.8 |
| 13 | −47.043 | 0.100 | — | — |
| 14 | 26.971 | 4.522 | 1.48749 | 70.2 |
| 15 | −26.971 | 1.500 | 1.83481 | 42.7 |
| 16 | 52.869 | 5.053 | — | — |
| 17 | 58.927 | 2.000 | 1.84666 | 23.8 |
| 18 | 23.385 | 1.307 | — | — |
| 19 | −377.425 | 2.467 | 1.65160 | 58.5 |
| 20 | −29.833 | 0.100 | — | — |
| 21 | −66.632 | 1.868 | 1.65160 | 58.5 |
| 22 | −42.526 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | −1.00 | −0.9128 × 10$^{-5}$ | −0.2723 × 10$^{-7}$ | −0.1768 × 10$^{-10}$ |

[Embodiment 3]

Figure 9:
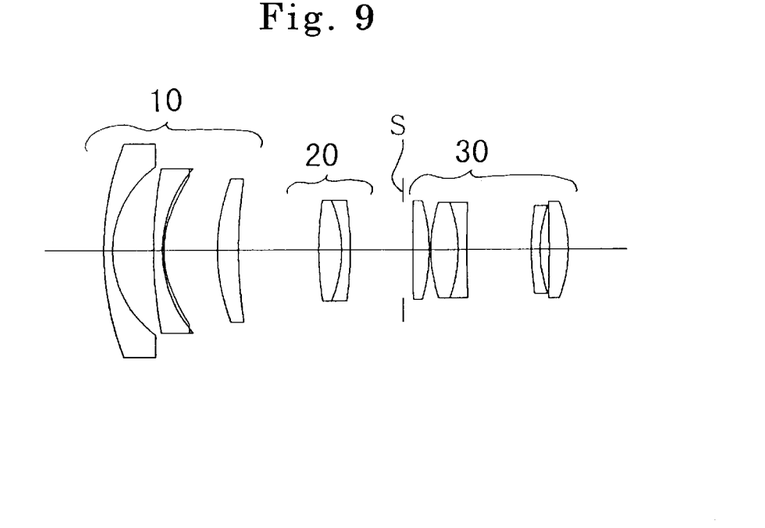
FIG. 9 is a lens arrangement of a third embodiment of a zoom lens system at the short focal length extremity.
Figure 10A:
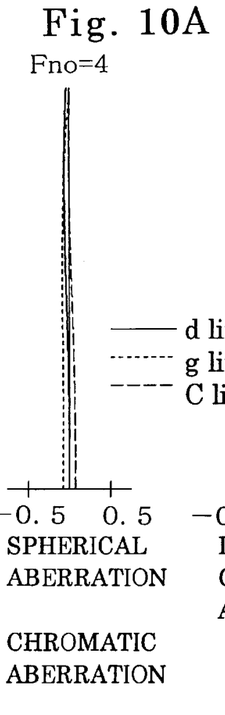
FIGS. 10A, 10B, 10C and 10D are aberration diagrams of the lens arrangement shown in FIG. 9.
Figure 10B:
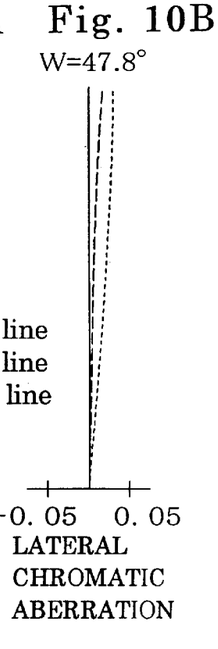
Figure 10C:
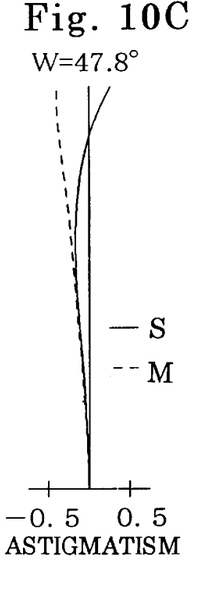
Figure 10D:
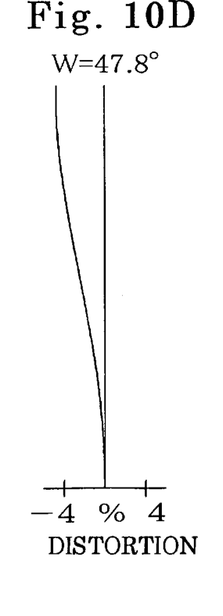
Figure 11:
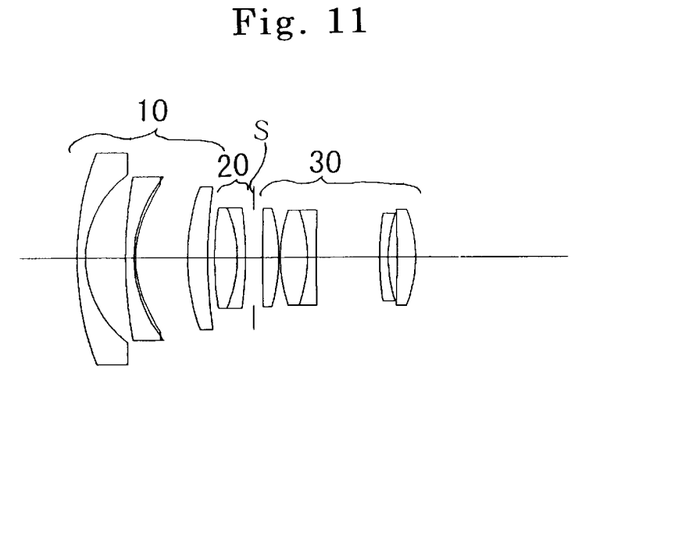
FIG. 11 is the lens arrangement of the third embodiment of the zoom lens system at the long focal length extremity.
Figures 12A, 12B, 12C:
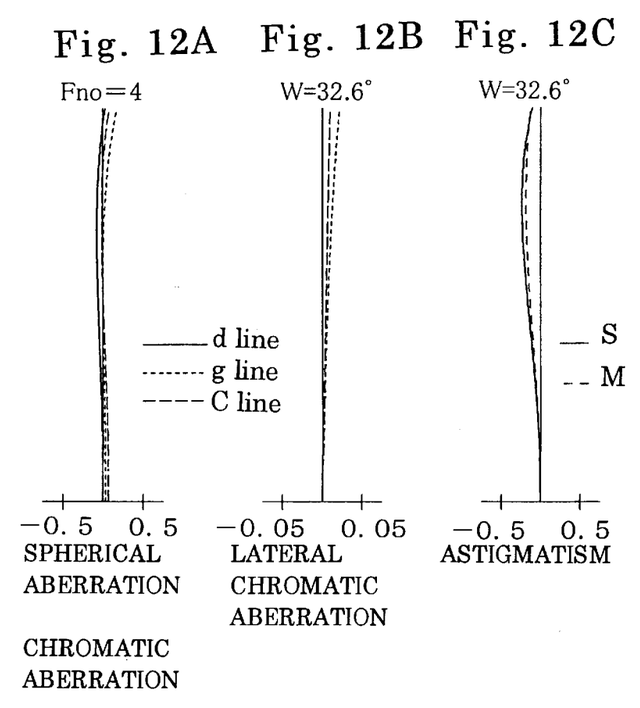
FIGS. 12A, 12B, 12C and 12D are aberration diagrams of the lens arrangement shown in FIG. 11.
Figure 12D:
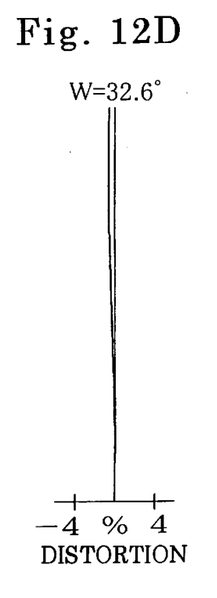

FIGS. 9 and 11 respectively show the lens arrangements of a third embodiment of a zoom lens system at the short focal length extremity and the long focal length extremity. FIGS. 10A, 10B, 10C, 10D, and 12A, 12B, 12C, 12D are aberration diagrams of the lens arrangements shown in FIGS. 9 and 11. Table 3 shows the numerical data thereof. Surface Nos. 1 through 7 are the negative first lens group 10, surface Nos. 8 through 10 are the positive second lens group 20, and surface Nos. 11 through 19 are the positive third lens group 30. The first lens group 10 includes a negative lens element, a hybrid lens element whose image-side surface is formed as an aspherical surface, and a positive lens element, in this order from the object. The second lens group 20 includes a cemented sub-lens group having a positive lens element and a negative lens element. The third lens group 30 includes a positive lens element, a cemented sub-lens group having a positive lens element and a negative lens element, a negative lens element, a positive lens element, in this order from the object.

TABLE 3

$F_{NO} = 1{:}4{-}4$
f = 20.60–34.00 (Zoom Ratio: 1.65)
W = 47.8–32.6
$f_B$ = 37.92–54.88

| Surface No. | R | D | Nd | ν |
|---|---|---|---|---|
| 1 | 52.836 | 1.500 | 1.77250 | 49.6 |
| 2 | 18.615 | 7.023 | — | — |
| 3 | 78.317 | 1.500 | 1.80400 | 46.6 |
| 4 | 22.563 | 0.280 | 1.53256 | 45.9 |
| 5* | 18.000 | 9.124 | — | — |
| 6 | 36.637 | 3.542 | 1.84666 | 23.8 |
| 7 | 85.443 | 13.769–1.214 | — | — |
| 8 | 57.322 | 3.941 | 1.51742 | 52.4 |
| 9 | −22.964 | 1.500 | 1.80400 | 46.6 |
| 10 | −63.439 | 9.115–1.400 | — | — |
| Diaphragm | ∞ | 1.652 | — | — |
| 11 | 775.294 | 2.795 | 1.60323 | 42.3 |
| 12 | −31.022 | 0.300 | — | — |
| 13 | 26.810 | 4.705 | 1.48749 | 70.2 |
| 14 | −24.770 | 1.500 | 1.83400 | 37.2 |
| 15 | 202.919 | 11.111 | — | — |
| 16 | 52.016 | 1.500 | 1.84666 | 23.8 |
| 17 | 23.807 | 1.570 | — | — |
| 18 | −245.653 | 3.283 | 1.58913 | 61.2 |
| 19* | −23.366 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | −1.00 | −0.9901 × 10$^{-5}$ | −0.1641 × 10$^{-7}$ | −0.6366 × 10$^{-10}$ |
| 19 | −0.00 | −0.3449 × 10$^{-5}$ | −0.2773 × 10$^{-8}$ | −0.1103 × 10$^{-9}$ |

[Embodiment 4]

Figure 13:
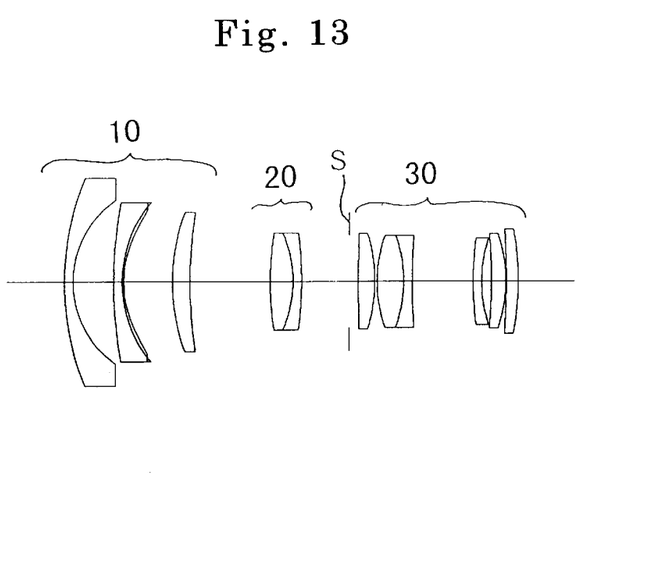
FIG. 13 is a lens arrangement of a fourth embodiment of a zoom lens system at the short focal length extremity.
Figures 14A, 14B:
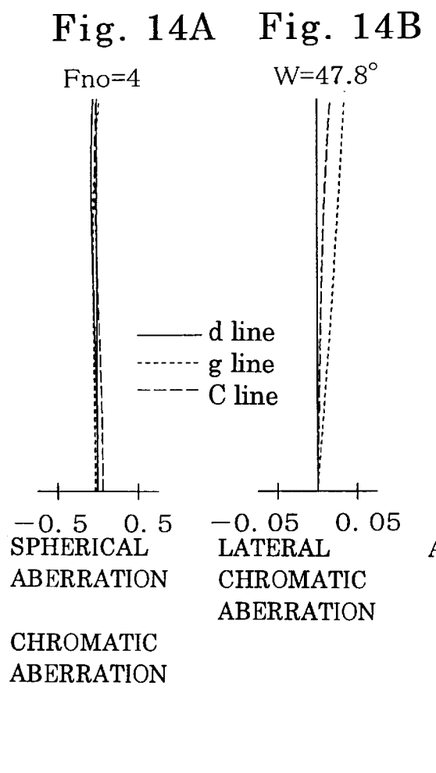
FIGS. 14A, 14B, 14C and 14D are aberration diagrams of the lens arrangement shown in FIG. 13.
Figure 14C:
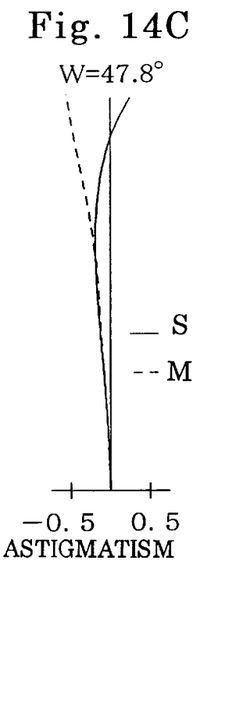
Figure 14D:
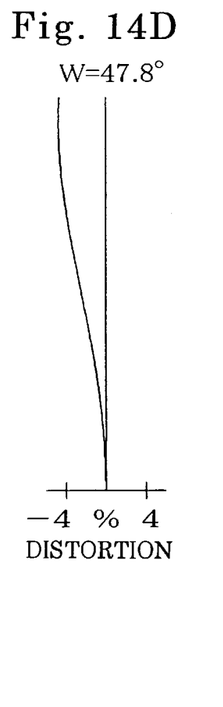
Figure 15:
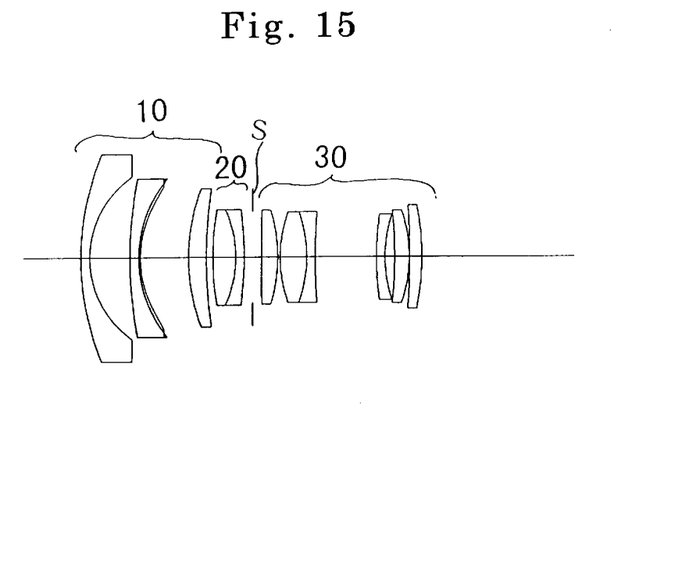
FIG. 15 is the lens arrangement of the fourth embodiment of the zoom lens system at the long focal length extremity.
Figure 16A:
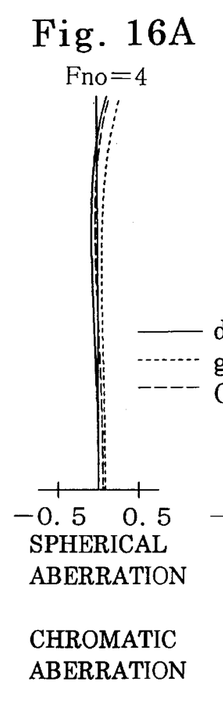
FIGS. 16A, 16B, 16C and 16D are aberration diagrams of the lens arrangement shown in FIG. 15.
Figure 16B:
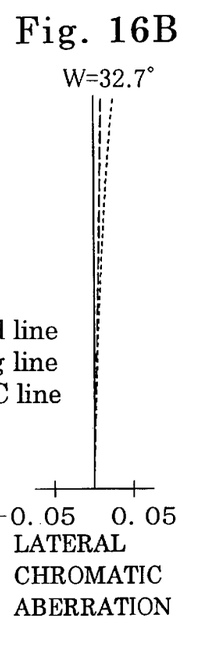
Figure 16C:
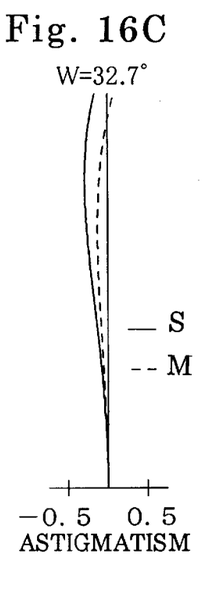
Figure 16D:
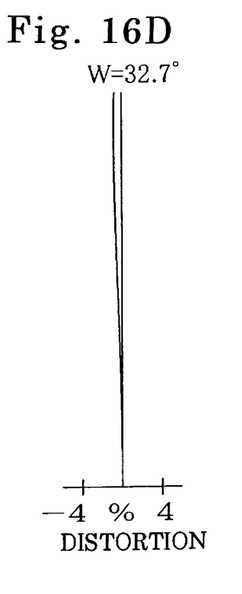

FIGS. 13 and 15 respectively show the lens arrangements of a fourth embodiment of a zoom lens system at the short focal length extremity and the long focal length extremity. FIGS. 14A, 14B, 14C, 14D, and 16A, 16B, 16C, 16D are aberration diagrams of the lens arrangements shown in FIGS. 13 and 15. Table 4 shows the numerical data thereof. The lens arrangement of this embodiment is substantially the same as that of the first embodiment.

TABLE 4

$F_{NO} = 1{:}4{-}4$
f = 20.60–34.00 (Zoom Ratio: 1.65)
W = 47.8–32.7
$f_B$ = 36.90–53.81

| Surface No. | R | D | Nd | ν |
|---|---|---|---|---|
| 1 | 49.801 | 1.500 | 1.77250 | 49.6 |
| 2 | 18.154 | 7.124 | — | — |
| 3 | 78.507 | 1.500 | 1.80400 | 46.6 |
| 4 | 22.601 | 0.280 | 1.53256 | 45.9 |
| 5* | 18.000 | 8.542 | — | — |
| 6 | 35.566 | 3.141 | 1.84666 | 23.8 |
| 7 | 85.560 | 14.062–1.200 | — | — |
| 8 | 55.294 | 4.011 | 1.51742 | 52.4 |
| 9 | −21.335 | 1.500 | 1.80400 | 46.6 |
| 10 | −64.253 | 8.363–1.400 | — | — |
| Diaphragm | ∞ | 1.612 | — | — |
| 11 | 407.250 | 2.868 | 1.60323 | 42.3 |
| 12 | −29.307 | 0.434 | — | — |
| 13 | 25.320 | 4.663 | 1.48749 | 70.2 |
| 14 | −24.578 | 1.500 | 1.83400 | 37.2 |
| 15 | 120.988 | 10.768 | — | — |
| 16 | 59.183 | 1.500 | 1.84666 | 23.8 |
| 17 | 24.867 | 1.700 | — | — |
| 18 | −91.377 | 2.579 | 1.58913 | 61.2 |
| 19 | −25.913 | 0.100 | — | — |
| 20 | −125.617 | 2.112 | 1.58913 | 61.2 |
| 21 | −47.568 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | −1.00 | −0.9379 × 10$^{-5}$ | −0.2702 × 10$^{-7}$ | −0.5875 × 10$^{-10}$ |

[Embodiment 5]

Figure 17:
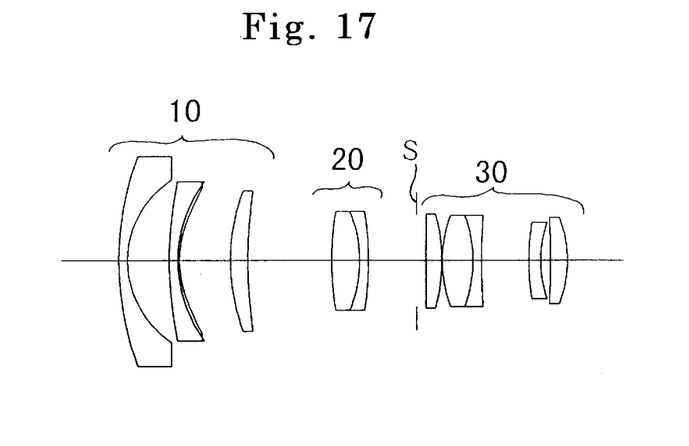
FIG. 17 is a lens arrangement of a fifth embodiment of a zoom lens system at the short focal length extremity.
Figures 18A, 18B, 18C:
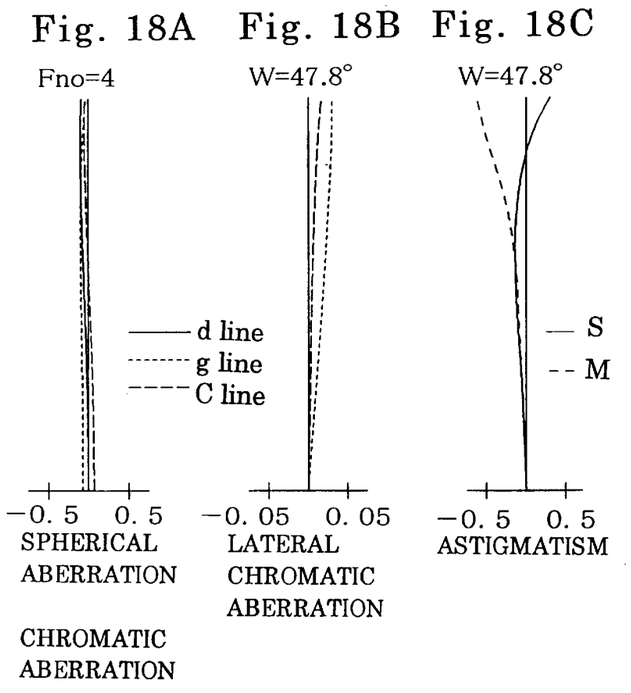
FIGS. 18A, 18B, 18C and 18D are aberration diagrams of the lens arrangement shown in FIG. 17.
Figure 18D:
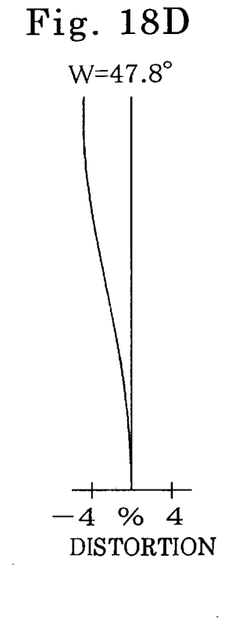
Figure 19:
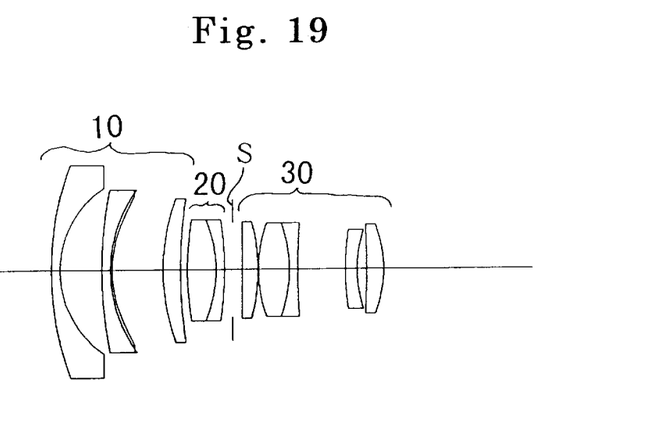
FIG. 19 is the lens arrangement of the fifth embodiment of the zoom lens system at the long focal length extremity.
Figures 20A, 20B:
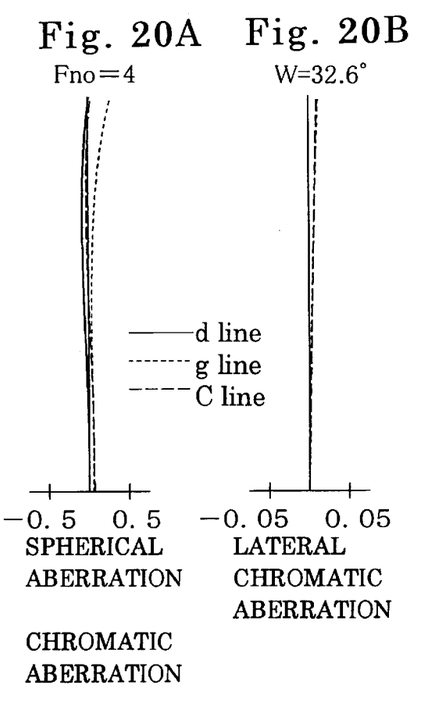
FIGS. 20A, 20B, 20C and 20D are aberration diagrams of the lens arrangement shown in FIG. 19.
Figure 20C:
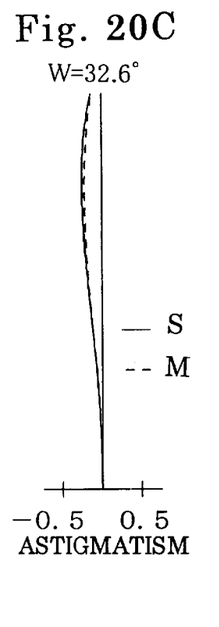
Figure 20D:
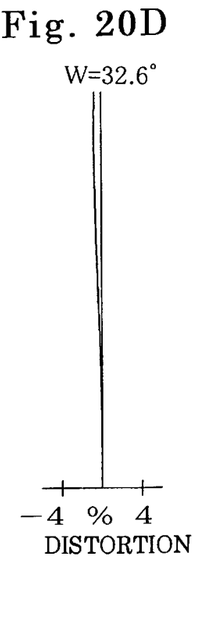

FIGS. 17 and 19 respectively show the lens arrangements of a fifth embodiment of a zoom lens system at the short focal length extremity and the long focal length extremity. FIGS. 18A, 18B, 18C, 18D, and 20A, 20B, 20C, 20D are aberration diagrams of the lens arrangements shown in FIGS. 17 and 19. Table 5 shows the numerical data thereof. The lens arrangement of this embodiment is substantially the same as that of the third embodiment.

TABLE 5

$F_{NO} = 1{:}4{-}4$
f = 20.60–34.01 (Zoom Ratio: 1.65)
W = 47.8–32.6
$f_B$ = 36.90–53.15

| Surface No. | R | D | Nd | ν |
|---|---|---|---|---|
| 1 | 54.900 | 1.500 | 1.77250 | 49.6 |
| 2 | 17.929 | 7.300 | — | — |
| 3 | 71.700 | 1.500 | 1.80400 | 46.6 |
| 4 | 24.600 | 0.280 | 1.53256 | 45.9 |
| 5* | 19.581 | 8.930 | — | — |
| 6 | 37.350 | 3.050 | 1.84666 | 23.8 |
| 7 | 84.318 | 14.851–1.200 | — | — |
| 8 | 56.405 | 5.000 | 1.51742 | 52.4 |
| 9 | −23.707 | 1.500 | 1.80400 | 46.6 |
| 10 | −59.155 | 8.485–1.400 | — | — |
| Diaphragm | ∞ | 1.700 | — | — |
| 11 | ∞ | 2.730 | 1.61772 | 49.8 |
| 12 | −33.209 | 0.100 | — | — |
| 13 | 24.406 | 5.400 | 1.48749 | 70.2 |
| 14 | −24.406 | 1.500 | 1.80610 | 40.9 |
| 15 | 135.000 | 8.380 | — | — |
| 16 | 46.238 | 2.080 | 1.84666 | 23.8 |
| 17 | 21.500 | 1.730 | — | — |
| 18 | −139.000 | 3.000 | 1.58913 | 61.2 |
| 19* | −22.003 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | −1.00 | −0.9670 × 10⁻⁵ | −0.1870 × 10⁻⁷ | −0.8470 × 10⁻¹⁰ |
| 19 | 0.00 | 0.2530 × 10⁻⁵ | −0.6230 × 10⁻⁸ | −0.2970 × 10⁻⁹ |

[Embodiment 6]

Figure 21:
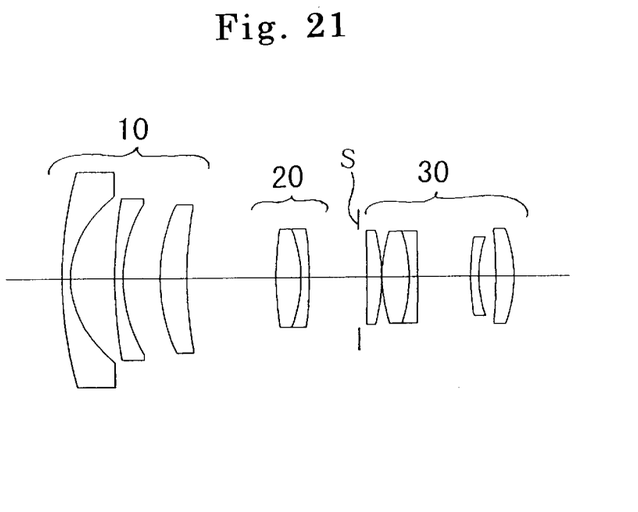
FIG. 21 is a lens arrangement of a sixth embodiment of a zoom lens system at the short focal length extremity.
Figures 22A, 22B:
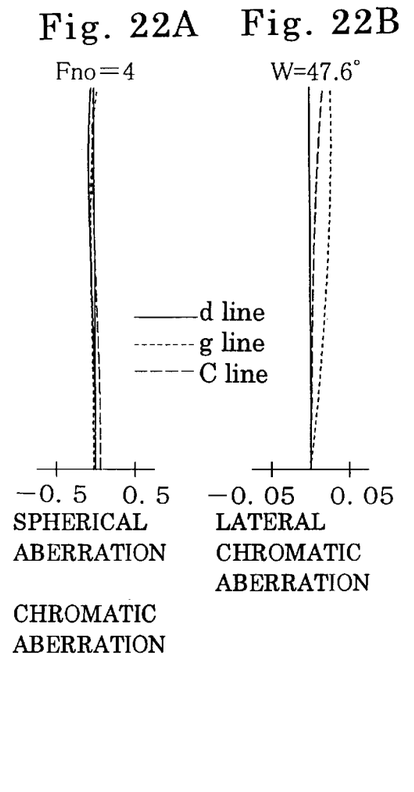
FIGS. 22A, 22B, 22C and 22D are aberration diagrams of the lens arrangement shown in FIG. 21.
Figures 22C, 22D:
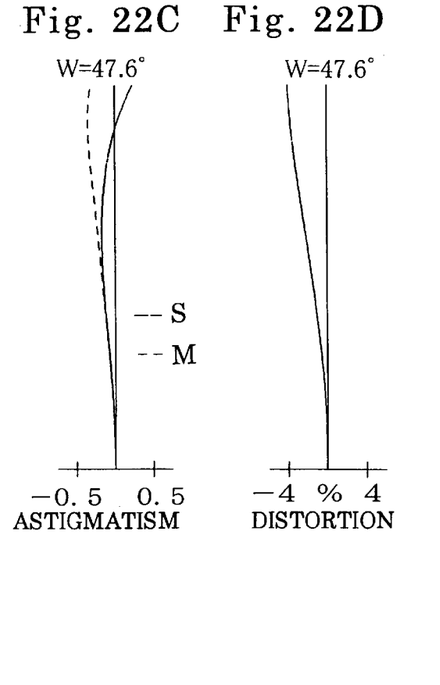
Figure 23:
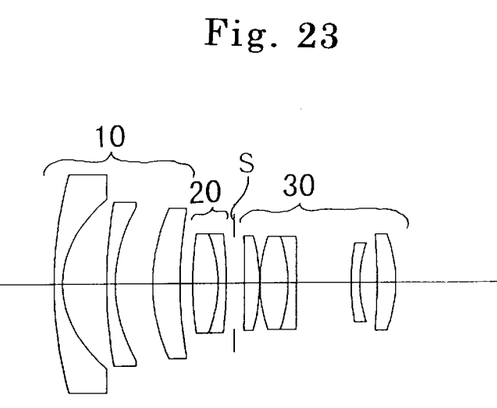
FIG. 23 is the lens arrangement of the sixth embodiment of the zoom lens system at the long focal length extremity.
Figures 24A, 24B:
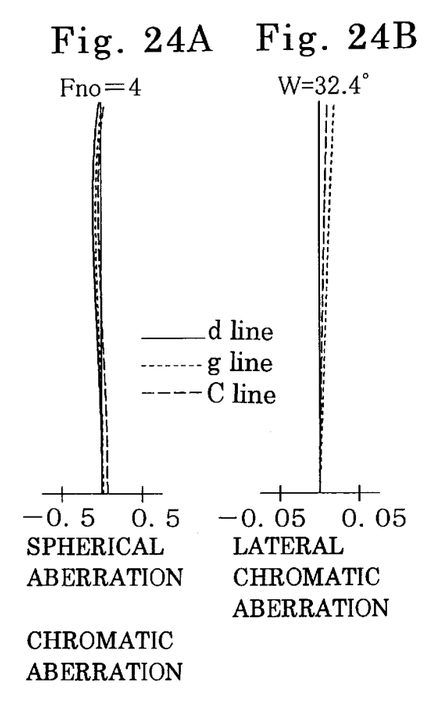
FIGS. 24A, 24B, 24C and 24D are aberration diagrams of the lens arrangement shown in FIG. 23.
Figure 24C:
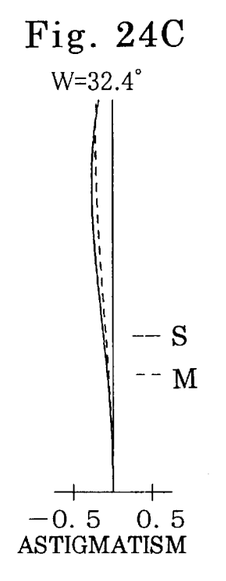
Figure 24D:
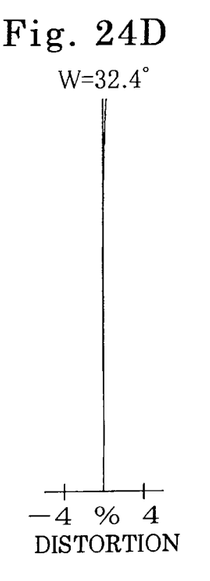

FIGS. 21 and 23 respectively show the lens arrangements of a sixth embodiment of a zoom lens system at the short focal length extremity and the long focal length extremity. FIGS. 22A, 22B, 22C, 22D, and 24A, 24B, 24C, 24D are aberration diagrams of the lens arrangements shown in FIGS. 21 and 23. Table 6 shows the numerical data thereof. Surface Nos. 1 through 6 are the negative first lens group 10, surface Nos. 7 through 9 are the positive second lens group 20, and surface Nos. 10 through 18 are the positive third lens group 30. The first lens group 10 includes a negative lens element, a negative lens element, and a positive lens element, in this order from the object. The second lens group 20 includes a cemented sub-lens group having a positive lens element and a negative lens element. The third lens group 30 includes a positive lens element, a cemented sub-lens group having a positive lens element and a negative lens element, a negative lens element, a positive lens element, in this order from the object.

TABLE 6

$F_{NO} = 1:4\text{--}4$
$f = 20.60\text{--}34.00$ (Zoom Ratio: 1.65)
$W = 47.6\text{--}32.4$
$f_B = 37.00\text{--}53.30$

| Surface No. | R | D | Nd | ν |
|---|---|---|---|---|
| 1 | 73.206 | 1.500 | 1.77250 | 49.6 |
| 2* | 16.443 | 7.887 | — | — |
| 3 | 85.215 | 1.500 | 1.80400 | 46.6 |
| 4 | 27.101 | 6.662 | — | — |
| 5 | 32.995 | 4.789 | 1.84666 | 23.8 |
| 6 | 74.700 | 16.026–2.243 | — | — |
| 7 | 58.537 | 4.475 | 1.51742 | 52.4 |
| 8 | −24.656 | 1.500 | 1.80400 | 46.6 |
| 9 | −72.058 | 8.519–1.400 | — | — |
| Diaphragm | ∞ | 1.800 | — | — |
| 10 | −364.978 | 2.647 | 1.60729 | 49.2 |
| 11 | −32.717 | 0.100 | — | — |
| 12 | 26.390 | 4.928 | 1.48749 | 70.2 |
| 13 | −26.390 | 1.500 | 1.83400 | 37.2 |
| 14 | −560.543 | 9.647 | — | — |
| 15 | 41.983 | 1.500 | 1.84666 | 23.8 |
| 16 | 21.986 | 3.089 | — | — |
| 17 | −89.046 | 3.300 | 1.58913 | 61.2 |
| 18* | −23.799 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 2 | −0.74 | 0.5285 × 10⁻⁵ | 0.8655 × 10⁻⁸ | 0.6283 × 10⁻¹¹ |
| 18 | 0.00 | 0.6784 × 10⁻⁵ | 0.1280 × 10⁻⁷ | −0.5151 × 10⁻¹⁰ |

Table 7 shows the values of each condition for each embodiment.

TABLE 7

|  | Condition (1) | Condition (2) |
|---|---|---|
| Embodiment 1 | 0.433 | 0.314 |
| Embodiment 2 | 0.368 | 0.426 |
| Embodiment 3 | 0.576 | 0.319 |
| Embodiment 4 | 0.520 | 0.294 |
| Embodiment 5 | 0.529 | 0.360 |
| Embodiment 6 | 0.531 | 0.292 |

As can be understood from the above table, each embodiment satisfies each condition, and various aberrations are relatively well corrected. Field curvature is indicated by astigmatism.

According to the present invention, a wide-angle zoom lens system, which has an angle-of-view of more than 90° at the short focal length extremity, and which is compact, and can adequately correct filed curvature, can be obtained.

What is claimed is:

1. A wide-angle zoom lens system comprising a negative first lens group, a positive second lens group, a diaphragm, and a positive third lens group, in this order from an object;

wherein upon zooming from the short focal length extremity towards the long focal length extremity, each lens group is arranged to move so that the space between said first and second lens groups and the space between said second and third lens groups are narrowed; and wherein said wide-angle zoom lens system satisfies the following condition:

$$0.36 < (D2S - D2L)/(fL - fS) < 0.7$$

wherein:

D2S designates the distance between said second lens group and said third lens group at the short focal length extremity;

D2L designates the distance between said second lens group and said third lens group at the long focal length extremity;

fL designates the focal length of the entire lens system at the long focal length extremity; and fS designates the focal length of the entire lens system at the short focal length extremity.

2. The wide-angle zoom lens system according to claim 1, wherein said wide-angle zoom lens system satisfies the following condition:

$$0.25 < f23S/f2 < 0.5$$

wherein:

f23S designates the combined focal length of said second lens group and said third lens group at the short focal length extremity; and f2 designates the focal length of said second lens group.

3. The wide-angle zoom lens system according to claim 1, wherein said diaphragm moves integrally with said third lens group.

* * * * *